Patented Feb. 19, 1935

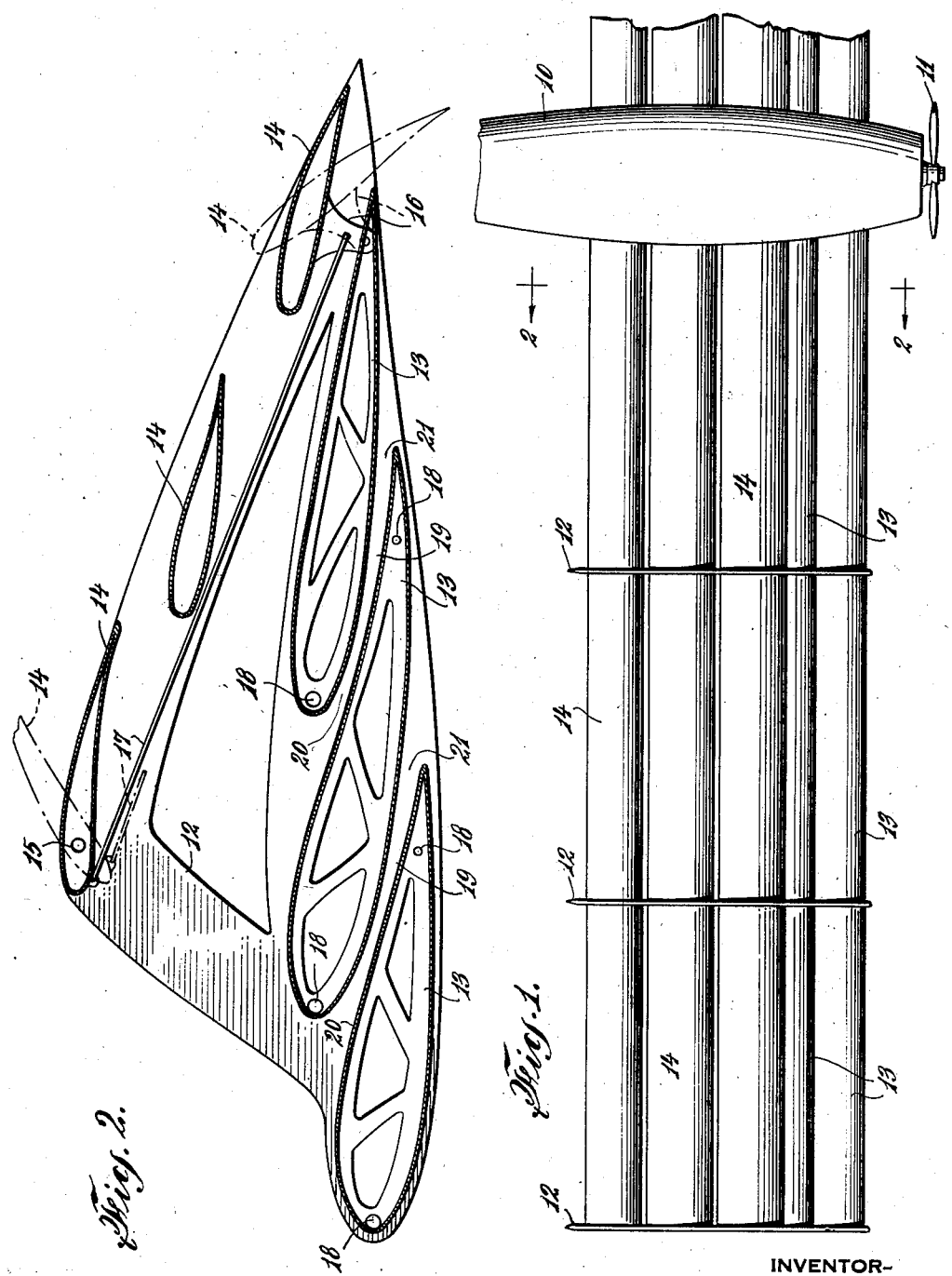

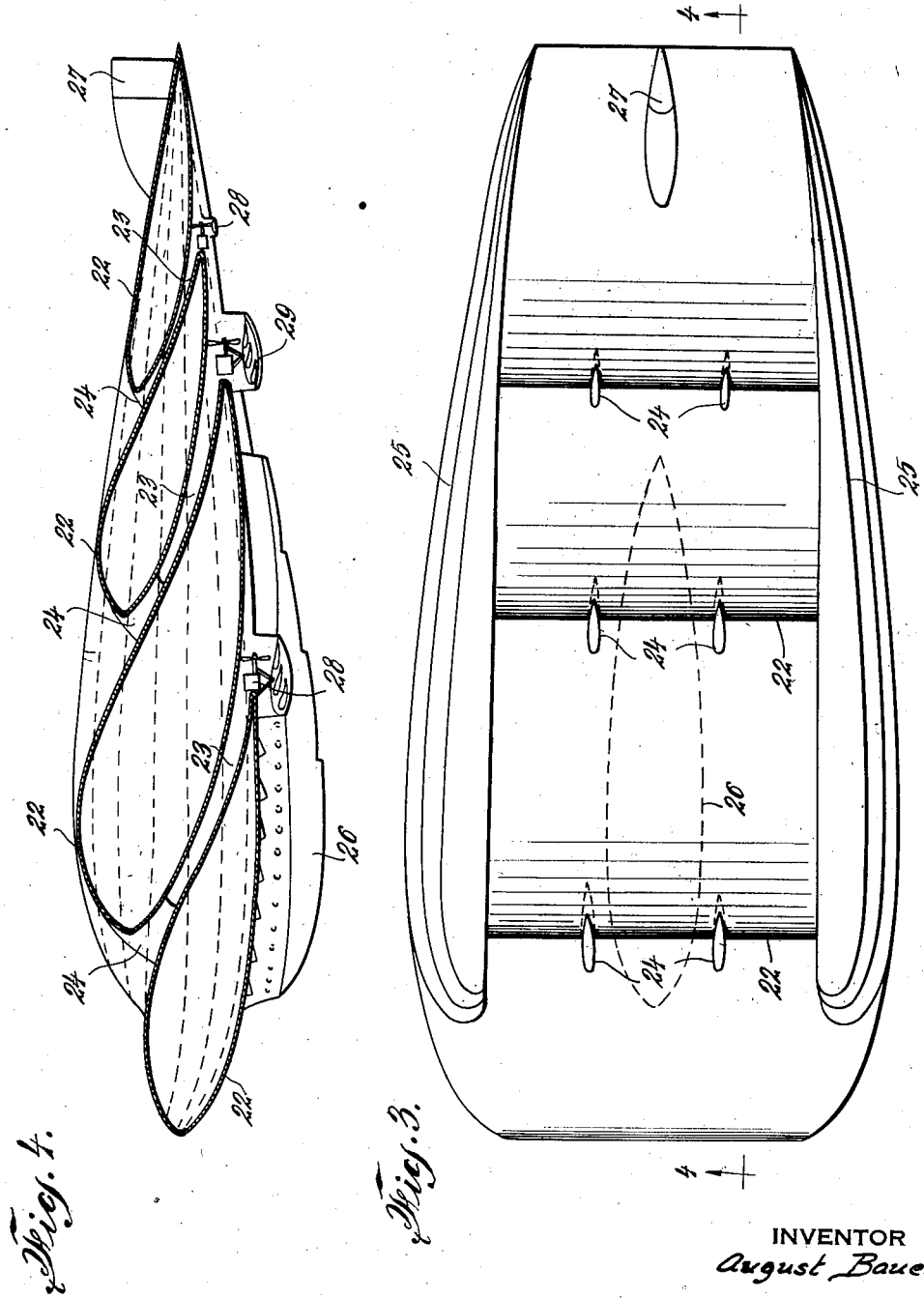

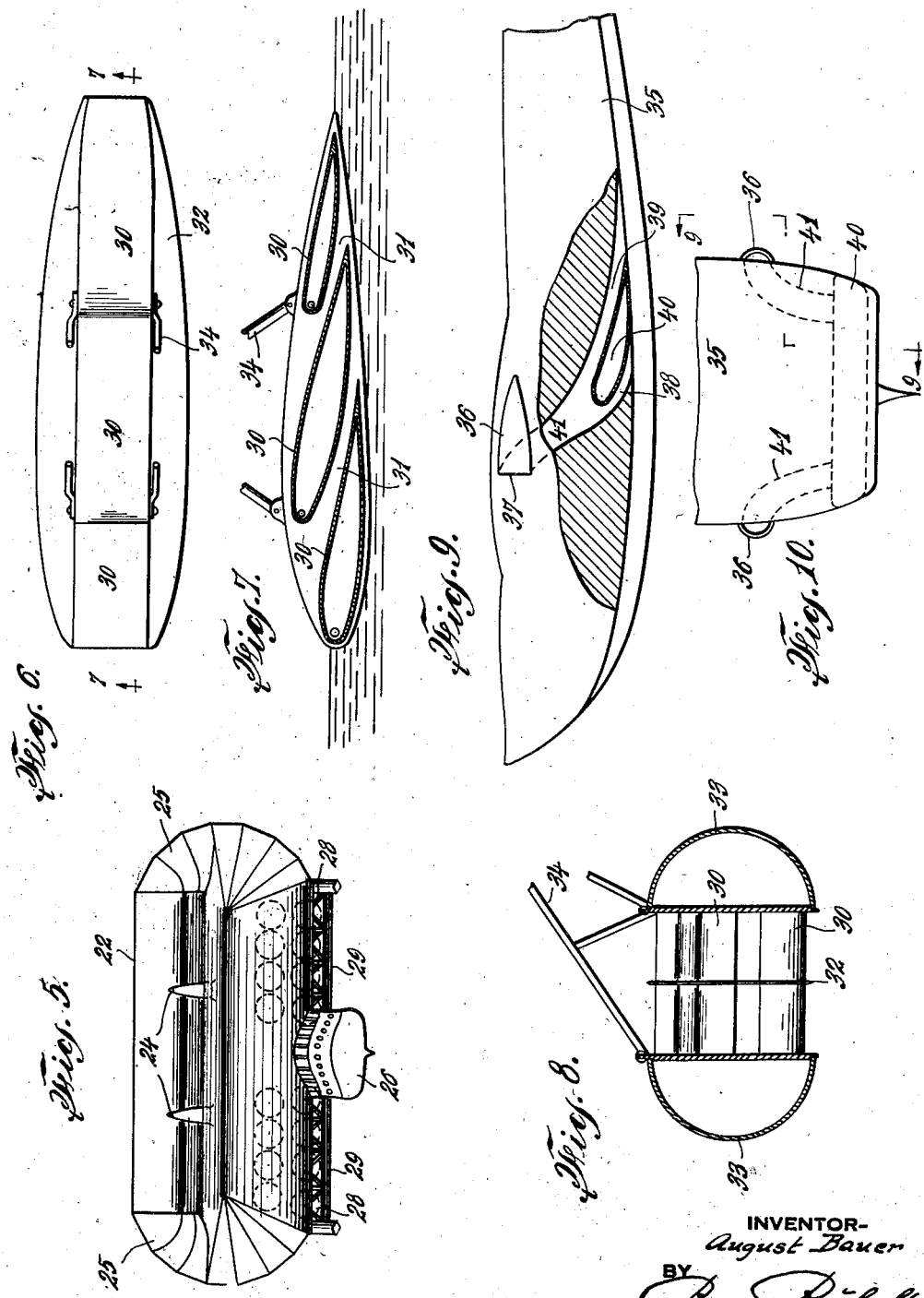

1,991,651

UNITED STATES PATENT OFFICE 1,991,651

WING CONSTRUCTION

August Bauer, Brooklyn, N. Y.

Application October 7, 1931, Serial No. 567,412

9 Claims. (Cl. 244—12)

The present invention relates, generically, to a novel and improved wing construction adapted to considerably enhance the lifting power of the craft to which it may be applied, as compared with the usual wing construction now in general use on aircraft and the like.

More specifically, the invention has especial relation to such a wing construction particularly adapted to be used in connection with airplanes, zeppelins, airplane pontoons, boats, propellers, windmills, and similar apparatus.

The primary object of the invention is the provision of a novel and improved wing construction capable of being substituted for the conventional form of wing construction now in use and adapted to greatly enhance the lifting power of the craft.

A further object of the invention resides in the provision of a wing construction, as outlined above, adapted to be applied in principle to airplanes, zeppelins, airplane pontoons, boats and the like without radically modifying the structure thereof.

It is still another object of the present invention to provide a new form of wing construction which shall preferably be made up of a plurality of small winglike members or elements disposed and arranged in a novel relationship, which may or may not be variable with respect to the several components, and which shall materially increase the lifting power as compared with the lifting power of the usual airplane or the like wing.

The foregoing and other objects which will be apparent to those skilled in the art to which the present invention pertains from the detailed description thereof hereinafter given, are attained by the illustrative embodiments of the invention herein disclosed, consisting of the construction and novel combination and arrangement of parts fully described below, illustrated on the accompanying sheets of drawings, and pointed out in the several claims hereunto appended.

On the said sheets of drawings,—

Fig. 1 is a top plan view of a portion of an airplane to which a wing construction according to the present invention has been applied;

Fig. 2 is a sectional view taken along line 2—2 of Fig. 1, alternative positions of certain of the parts being indicated by dot and dash lines;

Fig. 3 is a top plan view of a zeppelin type of aircraft with the present invention applied thereto;

Fig. 4 is a sectional view taken along line 4—4 of Fig. 3;

Fig. 5 is a front view of the zeppelin illustrated in Figs. 3 and 4;

Fig. 6 is a top plan view of an airplane pontoon to which the present invention has been applied, the connecting struts or braces being broken off;

Fig. 7 is a sectional view taken on line 7—7 of Fig. 6;

Fig. 8 is a front view of the pontoon shown in Figs. 6 and 7;

Fig. 9 is a part elevational and a part sectional view of the lower portion of a boat with the present invention applied thereto, the sectional view being along line 9—9 of Fig. 10; and Fig. 10 is an end view of the construction shown in Fig. 9.

Corresponding reference numerals designate corresponding parts throughout the several figures of the drawings.

Referring first to Figs. 1 and 2, it will be seen that these illustrate the present invention as applied to an airplane. A conventional fuselage is indicated at 10, and a conventional propeller at 11.

The novel wing construction adapted, as is usual, to extend from each side of fuselage 10, preferably comprises a plurality of spaced wing supporting struts or braces 12, shaped as shown in Fig. 2. Disposed between these struts 12 and supported thereby are a plurality of sets of wings or wing elements 13, 13, 13, and 14, 14, 14, the latter set being superposed with respect to the former set.

These several wings may be constructed in any desirable manner, within the scope of the present invention. For example, they may include any conventional supporting truss or beam construction, over which may be spread the usual fabric or metallic covering.

The end wings 14 of the uppermost set of wings are preferably capable of pivotal movement to the positions shown in Fig. 2, as well as to intermediate positions. For this purpose, these wings are pivotally mounted as at 15 and 16, respectively, and a control cable 17 is provided to enable these wings to be adjusted. Control cable 17, of course, is operated from suitable manual or automatic mechanism easily accessible to the pilot of the craft. The number of wings made movable in this way may be varied, as deemed desirable.

As is shown in Fig. 2 of the drawings, the several uppermost wings 14 are curved differently, the end wings being concaved downwardly and the intermediate wing 14 being convexed downwardly. In this manner a plurality of air passages is provided which extend through the wing and which tend to create a greater lift than is possible with the conventional wing. The shape and extent of these several passages is capable of variation, as desired.

The lowermost set of wings 13 is preferably reinforced by a series of pipes 18 or like members which extend longitudinally through the wings. Passages 19 are thus formed between the several wings 13 for the passage of air currents therethrough, thereby tending to further augment the lifting power of the novel wing construction.

Passageways 19 are formed with relatively enlarged ends 20 and 21 and an intermediate relatively constricted portion, so that the said passageways in effect constitute an elongated or distorted venturi which assists in creating a vacuum and in aiding the lifting capacity of the wings.

The wings elements 13 are, as shown, of such configuration that tangents drawn to the lower surfaces thereof adjacent the trailing ends thereof are substantially parallel to each other and to the general plane of the wing construction, whereby the production of a streamline air flow is facilitated.

In this manner a highly efficient and novel wing construction, capable of being adapted to the general type of airplane now commonly used, and possessing a much greater lifting power than the conventional airplane wing, is provided.

Referring now to the embodiment illustrated in Figs. 3, 4 and 5, these figures disclose the application of the principle of the present invention to an airship of the zeppelin type. This zeppelin, as is shown in these figures, is made up of a series of wings 22, consecutively arranged and spaced to provide a plurality of air passages 23 therebetween, similar in shape and function to passages 19, aforedescribed.

The zeppelin wings 22 are secured together in predetermined relationship, and retained in such position, by braces 24 disposed therebetween, and by half or less than half drop forms 25 at the ends thereof (see Figs. 3 and 5). As may be seen by reference to Fig. 3, the half drop forms 25 taper toward each other rearwardly of the craft.

A conventional type of zeppelin cabin 26 is supported in suspended relation from the two forwardmost wings 22, while the usual navigating means 27 may be mounted on the rearmost wing.

The zeppelin motors 28 are preferably mounted at the rear points of the three forwardmost wings 22, and the motor gondolas 29 may preferably also be provided with a series of wing elements according to the present invention, as may be clearly seen from Fig. 4.

It is thus evident from the foregoing description that the present invention comprehends a zeppelin type of airship having a greatly augmented lifting surface and power due to the inclusion therein of the novel wing construction in accordance with this invention.

Figs. 6, 7 and 8 illustrate the manner of applying the present invention to an airplane pontoon. The wing members 30 are constructed and arranged in a manner similar to the construction and arrangement of the wings 22 hereinbefore described. Passages 31 correspond in function and effect to passages 19 of the previously disclosed modification.

The several wings 30 are preferably connected by an intermediate brace member 32, and the ends thereof are connected by drop forms 33, which may be hollow and airtight in construction. The usual means 34 is provided to connect the pontoon to the airplane thereabove.

As a result of the construction described, the pontoon tends to add to the lifting power of the aircraft when in flight and, if the hydroplane is traveling on the water, the novel wing construction increases the buoyancy thereof.

The same principle is shown in Figs. 9 and 10 as applied to a boat 35. Semi-conical members 36 extend from the sides of the boat, as shown, and are provided with air inlets 37 leading into air passages 38, 39. The latter are formed by disposing a wing-shaped member 40 centrally of the outlet end of the air passages 41. When the boat is in motion, the air enters members 36 through inlets 37 and travels through passages 38 and 39, which tends to make the boat much more buoyant than usual as the air is forced out between the boat and the water.

While several illustrative embodiments of the invention have been described somewhat in detail, it is not intended to limit the scope of the invention thereby or otherwise than by the terms of the appended claims. For example, while drop forms 25 have been shaped to create natural waves of air, it is clear that the exact shape thereof may be widely varied without departing from the spirit of this invention.

What is claimed is:

1. A wing construction of the character described and adapted to be applied to an airplane, airplane element, pontoon, zeppelin or the like craft, said wing construction comprising a plurality of consecutively arranged spaced wing elements disposed in overlapped relationship, whereby an increased lifting surface and lifting power is produced, each said wing element comprising a supporting beam construction and a wing-defining covering thereon, the upper and lower surface of each said element comprising a convex portion, said wing elements defining a plurality of relatively downwardly directed elongated passages extending through the construction, said passages comprising enlarged ends and a constricted intermediate portion, the trailing edges of said elements being so arranged that tangents drawn to the lower sides of said elements adjacent said edges are substantially horizontal and substantially parallel, whereby a streamline air flow is facilitated.

2. A wing construction comprising a plurality of sets of wing elements, said sets being disposed above each other and the elements of each set also being disposed above each other, the elements of each set being spaced to define air passages extending through the construction, the trailing ends of the elements of one set being so arranged that tangents drawn to the lower surfaces of said elements adjacent said ends are substantially horizontal and parallel, whereby a streamline air flow is facilitated.

3. A wing construction of the character described comprising a plurality of sets of wing elements, said sets being disposed above each other and the elements of each set also being disposed above each other, the uppermost set comprising downwardly concaved end members and an intermediate downwardly convexed member, the elements of each set being spaced to define a plurality of air passages extending through said construction.

4. The construction defined in claim 3, said downwardly concaved end members being pivotally movable, and means to move said end members.

5. In an aircraft, a wing construction comprising a plurality of consecutively disposed, spaced, mutually overlapping wing elements, and means to interconnect and retain said elements in predetermined relationship, said means including a plurality of brace members intermediate of said elements and half drop forms at the ends thereof.

6. The construction defined in claim 5, said half drop forms tapering toward each other rearwardly of the aircraft.

7. In an airplane or the like comprising a fuselage, a wing construction comprising a plurality of spaced substantially triangularly shaped wing element supporting braces disposed severally at different distances laterally from the fuselage, and a plurality of spaced wing elements mounted on each of two sides of said triangular braces, said wing elements on one of said sides defining elongated passages of a venturi-like shape therebetween.

8. Aircraft of the zeppelin type comprising a plurality of spaced consecutively arranged wing elements, said elements defining a plurality of substantially downwardly directed air passages therebetween, means interconnecting said elements and including braces and half drop forms, a cabin suspended from said elements and navigating means mounted thereon.

9. A wing construction adapted to be applied to an airplane, airplane element, zeppelin or the like, said wing construction comprising a plurality of consecutively arranged, spaced wing elements disposed in overlapped relationship, said wing elements being of such configuration as to define elongated passageways therebetween, the ends of said passageways being enlarged and the intermediate portions being constricted whereby the said passageways are venturi-like in character, and tangents drawn to the lower surfaces of said elements adjacent the trailing ends thereof being substantially horizontally directed.

AUGUST BAUER.